US012609412B2

(12) United States Patent (10) Patent No.: US 12,609,412 B2
Jung et al. (45) Date of Patent: Apr. 21, 2026

(54) POLYETHYLENE MICROPOROUS MEMBRANE, METHOD FOR MANUFACTURING THE SAME, AND SEPARATOR INCLUDING MICROPOROUS MEMBRANE

(71) Applicants:SK INNOVATION CO., LTD., Seoul (KR); SK IE TECHNOLOGY CO., LTD., Seoul (KR)

(72) Inventors: In Hwa Jung, Daejeon (KR); Jae In Kwon, Daejeon (KR)

(73) Assignees: SK INNOVATION CO., LTD., Seoul (KR); SK IE TECHNOLOGY CO., LTD., Seoul (KR)

( * ) Notice: Subject to any disclaimer, the term of this patent is extended or adjusted under 35 U.S.C. 154(b) by 0 days.

(21) Appl. No.: 18/665,563

(22) Filed: May 16, 2024

(65) Prior Publication Data

US 2024/0387944 A1 Nov. 21, 2024

(30) Foreign Application Priority Data

May 17, 2023 (KR) ........................ 10-2023-0063525

(51) Int. Cl.
*H01M 50/417* (2021.01)
*H01M 50/403* (2021.01)
*H01M 50/491* (2021.01)
*H01M 50/494* (2021.01)

(52) U.S. Cl.
CPC ....... *H01M 50/417* (2021.01); *H01M 50/403* (2021.01); *H01M 50/491* (2021.01); *H01M 50/494* (2021.01)

(58) Field of Classification Search
CPC ............. H01M 50/417; H01M 50/403; H01M 50/491; H01M 50/494
See application file for complete search history.

(56) References Cited

U.S. PATENT DOCUMENTS

| | | | |
|---|---|---|---|
| 2007/0052130 A1 | 3/2007 | Lee et al. | |
| 2013/0116355 A1* | 5/2013 | Kang ..................... | B29C 48/08 |
| | | | 521/143 |
| 2014/0335396 A1* | 11/2014 | Onizawa ............. | H01M 50/489 |
| | | | 156/247 |

FOREIGN PATENT DOCUMENTS

| | | |
|---|---|---|
| CN | 114512767 A | 5/2022 |
| JP | 2013530261 A | 7/2013 |
| KR | 20060118135 A | 11/2006 |
| KR | 10-2016-0049492 A | 5/2016 |
| KR | 10-2016-0106177 A | 9/2016 |
| KR | 20220083881 A | 6/2022 |
| WO | 2006/123850 A1 | 11/2006 |
| WO | 2018164056 A1 | 9/2018 |
| WO | 2022/127224 A1 | 6/2022 |
| WO | WO-2024011978 A1 * | 1/2024 |

OTHER PUBLICATIONS

Extended European Search Report for European Patent Application No. 24175799.6 issued by the European Patent Office on Oct. 18, 2024.
Office Action for Korean Patent Application No. 10-2023-0063525 issued by the Korean Patent Office on Apr. 15, 2025.
Office Action for Japan Patent Application No. 2024-078102 issued by the Japan Patent Office on May 27, 2025.

* cited by examiner

*Primary Examiner* — Basia A Ridley
*Assistant Examiner* — Heng M. Chan
(74) *Attorney, Agent, or Firm* — IP & T GROUP LLP

(57) ABSTRACT
Provided are a polyethylene microporous membrane, a method for manufacturing the same, and a separator including the microporous membrane. According to an embodiment of the present disclosure, a microporous membrane is provided which includes a polyethylene having a weight average molecular weight of $1 \times 10^5$ g/mol to $10 \times 10^5$ g/mol, and has a thickness of 3 $\mu$m to 20 $\mu$m, a puncture strength of 0.25 N/$\mu$m or more, a gas permeability of $1.5 \times 10^{-5}$ Darcy or more, a shrinkage rate in the transverse direction of 10% or less as measured after being allowed to stand at 131° C. for 1 hour, a tensile strength in the machine direction of 1500 kg/cm² or more, a tensile strength in the transverse direction of 2000 kg/cm² or more, and a ratio between the tensile strength in the machine direction and the tensile strength in the transverse direction of 0.5 to 0.7.

19 Claims, No Drawings

POLYETHYLENE MICROPOROUS MEMBRANE, METHOD FOR MANUFACTURING THE SAME, AND SEPARATOR INCLUDING MICROPOROUS MEMBRANE

CROSS-REFERENCE TO RELATED APPLICATIONS

This application claims priority under 35 U.S.C. § 119 to Korean Patent Application No. 10-2023-0063525, filed on May 17, 2023, the disclosure of which is incorporated herein by reference in its entirety.

TECHNICAL FIELD

Embodiments of the present disclosure generally relate to separator technology for secondary batteries.

BACKGROUND

A polyethylene microporous membrane is used in various fields such as a separation filter, a separator for a secondary battery, a separator for a fuel cell, and a separator for a supercapacitor. Among them, it is widely used as a separator for a secondary battery, since it has excellent electrical insulation, ion permeability, and the like.

Since a secondary battery has a higher capacity and gets larger in order to be applied to an electric vehicle, an energy storage system (ESS), and the like, it is becoming a more important element to secure battery safety. For example, when a battery is exposed to or operated in an environment at a high temperature, a separator may be shrunk to cause an internal short circuit and there is a risk of fire due to the internal short circuit. Therefore, development of a polyethylene microporous membrane having excellent heat resistance which may prevent a temperature rise of a battery is needed. High mechanical strength is required with heat resistance for improving safety in a battery manufacturing process and during use of the battery. Additionally, high permeability for improving a capacity and output is also required.

As a method for increasing safety as such, Korean Patent Laid-Open Publication No. 10-2016-0106177 discloses a polyolefin microporous membrane which has an air permeation resistance in terms of 16 μm of 100-200 sec/100 cc, a puncture strength in terms of 16 μm of 550 gf or more, and a semi-crystallization time $t_{1/2}$ during isothermal crystallization at 117° C. of 10-35 minutes. However, the microporous membrane as such has a shrinkage rate in the transverse direction at 105° C. of only about 6% and safety of its battery in a high temperature environment such as in a hot-box evaluation is poor, and thus, the microporous membrane is not appropriate for being applied to a larger battery having high capacity.

Therefore, development of a polyethylene microporous membrane which has significantly improved heat resistance at a higher temperature while having high mechanical strength and permeability and, in particular, may also achieve excellent battery safety in a hot-box evaluation at 130° C. which is a high-temperature safety evaluation indicator is demanded.

SUMMARY

Embodiments of the present disclosure provide an improved a polyethylene microporous membrane, a method for manufacturing the same, and a separator for a battery including the microporous membrane. The polyethylene microporous membrane may exhibit improved heat resistance. The polyethylene microporous membrane may exhibit significantly improved heat resistance at a high temperature and excellent mechanical strength and permeability.

An embodiment of the present disclosure is directed to a polyethylene microporous membrane in a battery, and which may achieve excellent battery safety in a hot-box evaluation at 130° C. after assembling the battery. The battery may be a secondary battery.

The microporous membrane according to the present disclosure may be widely applied to a green technology field such as electric vehicles, battery charging stations, and other solar power generations and wind power generations using batteries. In addition, the microporous membrane of the present disclosure may be used in eco-friendly electric vehicles, hybrid vehicles, and the like which suppress air pollution and greenhouse gas emissions to prevent climate change. The microporous membrane may be used as a separator of a secondary battery.

According to an embodiment of the present disclosure a polyethylene microporous membrane is provided which includes a polyethylene having a weight average molecular weight of $1 \times 10^5$ g/mol to $10 \times 10^5$ g/mol, and has a thickness of 3 μm to 20 μm. The microporous membrane may have a puncture strength of 0.25 N/μm or more, a gas permeability of $1.5 \times 10^{-5}$ Darcy or more, a shrinkage rate in the transverse direction of 10% or less as measured after being allowed to stand at 131° C. for 1 hour, a tensile strength in the machine direction ($TS_{MD}$) of 1500 kg/cm² or more, a tensile strength in the transverse direction ($TS_{TD}$) of 2000 kg/cm² or more, and a ratio ($TS_{MD}/TS_{TD}$) between the tensile strength in the machine direction and the tensile strength in the transverse direction of 0.5 to 0.7.

In an embodiment, the polyethylene microporous membrane may have a tensile strength in the machine direction of 2000 kg/cm² or more and a tensile strength in the transverse direction of 2800 kg/cm² or more.

In an embodiment, an average value of the tensile strength in the machine direction and the tensile strength in the transverse direction may be 2500 kg/cm² or more. The average value may be calculated from $(TS_{MD}+TS_{TD})/2$.

In an embodiment, the polyethylene microporous membrane may have the puncture strength of 0.50 N/μm or more.

In an embodiment, the polyethylene microporous membrane may have a porosity of 30% to 70%.

In an embodiment, the polyethylene microporous membrane may be manufactured by a wet method including a sequential biaxial stretching process.

According to another embodiment of the present disclosure, a method for manufacturing a polyethylene microporous membrane includes: (a) melting and kneading a mixture including a polyethylene resin having a weight average molecular weight of $1 \times 10^5$ g/mol to $10 \times 10^5$ g/mol and a diluent through an extruder to prepare a melt; (b) extruding the melt to mold it into a sheet form; (c) sequentially biaxially stretching the sheet in the machine direction and in the transverse direction to mold it into a film; (d) extracting the diluent from the stretched film and drying the film; and (e) heat treating the dried film at a temperature at which 20% to 50% of crystals of the dried film melt, wherein in (c), a stretch ratio in the machine direction ($SR_{MD}$) is 4.0 times or more, a stretch ratio in the transverse direction ($SR_{TD}$) is 5.3 times or more, and a ratio ($SR_{MD}/SR_{TD}$) between the stretch ratio in the machine direction and the stretch ratio in the transverse direction is 0.5 to 0.75.

In an embodiment, the temperature at which 20% to 50% of the crystals of the dried film in (e) may be 133° C. to 145° C.

In still another embodiment of the present disclosure, a separator is provided, the separator including the polyethylene microporous membrane described above. Making the separator from the membrane may involve cutting the membrane to a desired size depending on the application. Also, the porosity and thickness of the membrane may be adjusted within the above porosity and thickness ranges depending upon a particular application.

In an exemplary embodiment, an electrochemical device includes the separator.

In an exemplary embodiment, the electrochemical device is a secondary battery comprising said separator between a positive electrode and a negative electrode. Other features and aspects will be apparent from the following detailed description, the drawings, and the claims.

DETAILED DESCRIPTION OF EMBODIMENTS

The embodiments described in the present specification may be modified in many different forms, and the technology according to an aspect is not limited to the embodiments set forth herein. In addition, the embodiments are provided so that the present disclosure may be described in more detail to a person with ordinary skill in the art.

In addition, the singular form used in the specification and claims appended thereto may be intended to include a plural form also, unless otherwise indicated in the context.

Unless otherwise defined in the present specification, values which may be outside a numerical range due to experimental error or rounding off a value are also included in the defined numerical range.

Furthermore, throughout the specification, "including" and "comprising" are used interchangeably and mean any constituent elements will be understood to imply further inclusion of other constituent elements rather than exclusion of other constituent elements.

The embodiments of the present disclosure are devised based on the rather unexpected discovery that when a ratio $(TS_{MD}/TS_{TD})$ between a tensile strength in the machine direction $(TS_{MD})$ and a tensile strength in the transverse direction $(TS_{TD})$ is controlled to be in a specific range, mechanical strength and permeability are excellent even at a small thickness and also significantly improved heat resistance at a high temperature may be secured.

According to an embodiment, when a polyethylene having a weight average molecular weight of $1 \times 10^5$ g/mol to $10 \times 10^5$ g/mol is included, a tensile strength in the machine direction $(TS_{MD})$ and a tensile strength in the transverse direction $(TS_{TD})$ at or above a certain value are satisfied, and a ratio $(TS_{MD}/TS_{TD})$ between the tensile strength in the machine direction $(TS_{MD})$ and the tensile strength in the transverse direction $(TS_{TD})$ is controlled to a specific range, a polyethylene microporous membrane having a puncture strength of 0.25 N/μm or more even at a small thickness of 3 μm to 20 μm, a gas permeability of $1.5 \times 10^{-5}$ Darcy or more, and a shrinkage rate in the transverse direction of 10% or less as measured after being allowed to stand at 131° C. for 1 hour may be provided.

A secondary battery according to an embodiment may secure both excellent battery performance and safety, by including the polyethylene microporous membrane satisfying the physical properties as described above simultaneously. In particular, embodiments of the present disclosure may provide a battery which exhibits excellent thermal safety at a high temperature so that battery fuming or ignition does not occur in a hot-box evaluation at a high temperature of 130° C. That is, since the polyethylene microporous membrane of the present disclosure satisfies the physical properties as described above simultaneously, it is appropriate for being applied to a high output/high capacity battery.

In an embodiment, the polyethylene microporous membrane satisfying the physical properties as described above simultaneously may be manufactured by implementing a ratio between a tensile strength in the machine direction and a tensile strength in the transverse direction to a specific range due to a stretching process in specific conditions.

In an embodiment, the polyethylene microporous membrane may be manufactured by implementing a ratio between a tensile strength in the machine direction and a tensile strength in the transverse direction to be in a specific range due to a heat fixation process in specific conditions together with a stretching process in specific conditions.

In an embodiment, the polyethylene microporous membrane may be manufactured by a wet method including a sequential biaxial stretching process at or above a specific stretch ratio, and thus, a polyethylene microporous membrane satisfying the physical properties as described above simultaneously may be provided.

Specifically, the polyethylene microporous membrane is manufactured by extruding a mixture of a diluent dissolved in a polyethylene resin and sequentially biaxially stretching it to satisfy a specific stretch ratio to manufacture a film form, and extracting the diluent from the film, and may be manufactured by a wet method including a common sequential biaxial stretching process known to a person skilled in the art and is not limited as long as a microporous membrane having the physical properties as described above may be manufactured.

In an embodiment, the stretch ratio in the machine direction $(SR_{MD})$ may be 4.0 times or more, the stretch ratio in the transverse direction $(SR_{TD})$ may be 5.3 times or more, and the ratio $(SR_{MD}/SR_{TD})$ between the stretch ratio in the machine direction and the stretch ratio in the transverse direction may be 0.5 to 0.75. Accordingly, the polyethylene microporous membrane may have excellent mechanical strength and permeability even at a small thickness, and also may have significantly improved heat resistance at a high temperature.

Hereinafter, the polyethylene microporous membrane will be described in more detail.

In an embodiment, the ratio $(TS_{MD}/TS_{TD})$ between the tensile strength in the machine direction and the tensile strength in the transverse direction may be 0.5 or more and 0.65 or less or 0.7 or less, and for example, 0.5 to 0.7 or 0.5 to 0.65.

In an embodiment, the polyethylene microporous membrane may have the tensile strength in the machine direction $(TS_{MD})$ of 1500 kg/cm² or more, 1800 kg/cm² or more, or 2000 kg/cm² or more, and the upper limit of the $TS_{MD}$ value is not particularly limited, but may be 3500 kg/cm² or less or 3000 kg/cm² or less. In a specific embodiment, the $TS_{MD}$ value may be 1500 kg/cm² to 3500 kg/cm², 1800 kg/cm² to 3500 kg/cm², or 2000 kg/cm² to 3000 kg/cm², but the embodiment is not limited thereto.

In an embodiment, the microporous membrane of the embodiment may have the tensile strength in the transverse direction $(TS_{TD})$ of 2000 kg/cm² or more, 2500 kg/cm² or more, 2800 kg/cm² or more, or 3000 kg/cm² or more, and the upper limit of the $TS_{TD}$ value is not particularly limited, but, for example, 5000 kg/cm² or less or 4500 kg/cm² or less. In a specific embodiment, the $TS_{TD}$ value may be 2000 kg/cm² to 5000 kg/cm², 2500 kg/cm² to 5000 kg/cm², 2800 kg/cm² to 4500 kg/cm², or 3000 kg/cm² to 4500 kg/cm², but the embodiment is not limited thereto.

In an embodiment, the average value of the tensile strength in the machine direction and the tensile strength in the transverse direction may be 2500 kg/cm² or more, 2600 kg/cm² or more, or 2700 kg/cm² or more, and the upper limit of the average value is not particularly limited, but, for example, may be 4250 kg/cm² or less, 4000 kg/cm² or less, or 3750 kg/cm² or less. In a specific embodiment, the average value may be 2500 kg/cm² to 4250 kg/cm², 2600 kg/cm² to 4000 kg/cm², or 2700 kg/cm² to 3750 kg/cm², but the embodiment is not limited thereto.

The $TS_{MD}$ value, the $TS_{TD}$ value, and the average value in the ranges described above may be implemented by controlling the stretch ratio in the machine direction and the stretch ratio in the transverse direction to specific ranges in a stretching process or controlling a temperature in a heat fixation process to a specific range during the manufacture of the polyethylene microporous membrane, but the embodiments are not necessarily limited thereto.

Though the microporous membrane according to an embodiment has a small thickness, it has the $TS_{MD}/TS_{TD}$ value in the range described above and also a significantly improved tensile strength, and thus, its heat shrinkage is small and the heat resistance is significantly increased.

That is, as a result of performing a high-temperature hot-box evaluation of a battery manufactured using the microporous membrane according to an embodiment as a separator, the battery does not cause fuming or ignition in a high temperature environment and may have excellent battery safety. The manufacture of a battery for the evaluation and the evaluation method are as follows. A positive electrode using NCM 622 (Ni:Co:Mn=6:2:2) as an active material and a negative electrode using graphite carbon as an active material are wound with the microporous membrane of the present disclosure and added to an aluminum pouch to manufacture a battery. Subsequently, an electrolyte solution of 1 M lithium hexafluorophosphate (LiPF₆) dissolved in a solution including ethylene carbonate, ethyl methyl carbonate, and diethyl carbonate at a volume ratio of 3:5:2 is injected into the battery and the battery is sealed to manufacture a battery having a capacity of 2 Ah. Subsequently, the battery is subjected to aging and degassing operations, fully charged to 4.2 V, and put into an oven, which was heated by 5° C./min to reach 130° C. and then allowed to stand for 30 minutes, thereby confirming whether fuming or ignition occurred in the battery.

In an embodiment, the polyethylene microporous membrane may have a thickness of 3 μm to 20 μm, specifically 3 μm to 15 μm, more specifically 3 μm to 10 μm, and still more specifically 3 μm to 7 μm. The thickness of the microporous membrane may be measured using a contact type thickness meter (which may have a thickness precision of, for example, 0.1 μm). It was found that the microporous membrane of the present disclosure may implement excellent puncture strength, gas permeability, heat shrinkage rate, and tensile strength simultaneously even in a very thin membrane state in the range described above, and in particular, may have excellent thermal safety in the hot-box evaluation according to the evaluation method of the following examples. In addition, it may have excellent resistance to external stress occurring during manufacture of a battery, a temperature rise occurring during charge and discharge of a battery, a dendrite, and the like and have low internal resistance of a battery to improve charge and discharge performance of a battery.

In an embodiment, the polyethylene microporous membrane may have a puncture strength of 0.25 N/μm or more even in the thickness range described above, and specifically, the puncture strength may be 0.40 N/μm or more or 0.50 N/μm or more and its upper limit is not particularly limited, but for example, may be 1.0 N/μm or less. In a specific embodiment, the puncture strength may be 0.25 N/μm to 1.0 N/μm, 0.40 N/μm to 1.0 N/μm, or 0.50 N/μm to 1.0 N/μm, but the embodiment is not limited thereto. The puncture strength may be measured by attaching a pin tip (such as one having a diameter of 1.0 mm and a radius of curvature of 0.5 mm) and pressing the sample of the microporous membrane at a suitable speed (of e.g. 120 mm/min) against the pin tip, and then calculating the puncture strength by dividing the load (N) when the microporous membrane was broken by the thickness (μm) of the microporous membrane sample. Since the puncture strength in the range described above is satisfied, resistance to external stress occurring during manufacture of a battery, a dendrite occurring during charge and discharge of a battery, and the like is excellent, and thus, battery safety may be secured. In addition, a separator for a secondary battery may be thinned, and is appropriate for being applied to a high capacity/high output battery.

In an embodiment, the polyethylene microporous membrane may have a gas permeability of $1.5 \times 10^{-5}$ Darcy or more, and specifically, the gas permeability may be $1.6 \times 10^{-5}$ Darcy or more, $3.0 \times 10^{-5}$ Darcy or less, or $5.0 \times 10^{-5}$ Darcy or less. In a specific embodiment, the gas permeability may be $1.5 \times 10^{-5}$ Darcy to $5.0 \times 10^{-5}$ Darcy or $1.6 \times 10^{-5}$ Darcy to $3.0 \times 10^{-5}$ Darcy, but the embodiment is not limited thereto. Since the gas permeability range described above is satisfied, ion conductivity may be excellent, and battery charge and discharge characteristics may be improved due to low battery internal resistance.

In an embodiment, the polyethylene microporous membrane may have a shrinkage rate in the transverse direction of 10% or less, 8% or less, or 6% or less as measured after being allowed to stand at 131° C. for 1 hour, and the lower limit is not particularly limited, but for example, may be 0.1%, 0.5%, or 1%. In a specific embodiment, the shrinkage rate may be 0.1% to 10%, 0.5% to 8%, or 1% to 6%, but the embodiment is not limited thereto. The shrinkage rate in the transverse direction may be measured by allowing to hold a sample of the microporous membrane of a suitable size (for example 15 cm×15 cm) at a suitable test temperature for an appropriate time, e.g. at 150° C. for 1 hour, and then measuring the change in length to calculate the shrinkage rate in the transverse direction.

In an embodiment, the polyethylene microporous membrane may have a porosity of 30% to 70%, 40% to 70% or 50 to 70% in terms of mechanical strength and ion conductivity, but the embodiment is not limited thereto. The porosity is calculated by the following equation. Specifically, a sample having a width of A cm, a height of B cm, and a thickness of T cm is prepared, its mass is measured, and the porosity is calculated from a ratio between a mass of a resin having the same volume and a mass of a microporous membrane.

$$\text{Porosity (\%)} = 100 \times \left\{1 - M/(A \times B \times T \times \rho)\right\}$$

7 wherein M is a mass (g) of a microporous membrane, and $\rho$ is a density (g/cm$^3$) of a polyethylene resin forming a microporous membrane.

In an embodiment, the polyethylene microporous membrane may be manufactured by a wet method including a sequential biaxial stretching process, and thus, a polyethylene microporous membrane satisfying the physical properties as described above simultaneously may be provided.

Specifically, the polyethylene microporous membrane is manufactured by extruding and sequentially biaxially stretching a mixture of a diluent dissolved in a polyethylene resin to manufacture a film form and extracting the diluent from the film, and may be manufactured by a wet method including a common sequential biaxial stretching process known to a person skilled in the art and is not limited as long as a microporous membrane having the physical properties as described above may be manufactured.

In an embodiment, the stretch ratio in the machine direction (SR$_{MD}$) may be 4.0 times or more, the stretch ratio in the transverse direction (SR$_{TD}$) may be 5.3 times or more, and the ratio (SR$_{MD}$/SR$_{TD}$) between the stretch ratio in the machine direction and the stretch ratio in the transverse direction may be 0.5 to 0.75. Accordingly, the polyethylene microporous membrane may have excellent mechanical strength and permeability even at a small thickness, and also may have significantly improved heat resistance at a high temperature.

Hereinafter, the method for manufacturing a polyethylene microporous membrane according to an embodiment of the present disclosure will be described.

The method for manufacturing a polyethylene microporous membrane according to an embodiment includes: (a) melting and kneading a mixture including a polyethylene resin having a weight average molecular weight of 1×10$^5$ g/mol to 10×10$^5$ g/mol and a diluent through an extruder to prepare a melt; (b) extruding the melt to mold it into a sheet form; (c) sequentially biaxially stretching the sheet in the machine direction and in the transverse direction to mold it into a film; (d) extracting the diluent from the stretched film and drying the film; and (e) heat treating the dried film at a temperature at which 20% to 50% of crystals of the dried film melt, wherein in (c), a stretch ratio in the machine direction (SR$_{MD}$) is 4.0 times or more, a stretch ratio in the transverse direction (SR$_{TD}$) is 5.3 times or more, and a ratio (SR$_{MD}$/SR$_{TD}$) between the stretch ratio in the machine direction and the stretch ratio in the transverse direction is 0.5 to 0.75.

Hereinafter, each manufacturing operation will be described.

First, (a) is an operation of melting and kneading a mixture including a polyethylene resin and a diluent through an extruder to prepare a melt, and the mixture may include the polyethylene resin and the diluent at a weight ratio of 10-60:90-40 for forming pores, specifically at a weight ratio of 20-40:80-60, but the embodiment is not particularly limited as long as the purpose of the present disclosure is achieved. When the weight ratio range described above is satisfied, the melt has sufficient flowability, so that it is easy to perform uniform sheet molding in a subsequent operation, sufficient orientation is performed in a stretching process, so that it is easy to secure mechanical strength, and a complication such as fracture in a stretching process may not arise.

The polyethylene resin may be a high-density polyethylene or include a high-density polyethylene in terms of strength, extrusion kneadability, stretchability, heat resistance of a final microporous membrane, and the like.

In an embodiment, the polyethylene resin may have a weight average molecular weight of 1×10$^5$ g/mol to 10×10$^5$ g/mol, specifically 3×10$^5$ g/mol to 8×10$^5$ g/mol, but the embodiment is not necessarily limited thereto.

In an embodiment, the polyethylene resin may have a melt temperature of 130° C. or higher, specifically 130° C. to 140° C., but the embodiment is not necessarily limited thereto. The melt temperature of the polyethylene resin may be determined by DSC.

In an embodiment, as the diluent, any organic compound forming a single phase with the polyethylene resin at extrusion temperature may be used without limitation. For example, the diluent may be one or a combination of two or more selected from the group consisting of aliphatic or cyclic hydrocarbons such as nonane, decane, decalin, paraffin oil, and paraffin wax, phthalic acid esters such as dibutyl phthalate and dioctyl phthalate, C10-C20 fatty acids such as palmitic acid, stearic acid, oleic acid, linoleic acid, and linolenic acid, and C10-C20 fatty alcohols such as cetyl alcohol, stearyl alcohol, and oleyl alcohol. A specific example of the diluent may include a paraffin oil having a kinetic viscosity at 40° C. of 20 cSt to 200 cSt, but the embodiment is not limited thereto.

In addition, the mixture may further include one or more of general additives for improving specific functions such as an oxidation stabilizer, a UV stabilizer, and an antistatic agent in a range where the characteristics of the microporous membrane are not greatly deteriorated.

Operation (b) is an operation of extruding the melt to mold it into a sheet form and may be performed without limitation by a method known to a person skilled in the art, and as an example, the melt may be molded into a sheet form by casting or calendaring method while the melt is extruded through a T-die and cooled to a temperature of 10° C. to 80° C.

In operation (c), the stretch ratio in the machine direction (SR$_{MD}$) may be 4.0 times or more, the stretch ratio in the transverse direction (SR$_{TD}$) may be 5.3 times or more, and the ratio (SR$_{MD}$/SR$_{TD}$) between the stretch ratio in the machine direction and the stretch ratio in the transverse direction may be 0.5 to 0.75. Accordingly, since the ratio (TS$_{MD}$/TS$_{TD}$) between the tensile strength in the machine direction (TS$_{MD}$) and the tensile strength in the transverse direction (TS$_{TD}$) may be controlled to a specific range, a polyethylene microporous membrane which has excellent mechanical strength and permeability even at a small thickness, and also has significantly improved heat resistance at a high temperature may be manufactured.

The stretch ratio in the machine direction may be specifically 4 times to 10 times, more specifically 5 times to 8 times, and the stretch ratio in the transverse direction may be 5.3 times to 15 times, more specifically 6 times to 10 times. Since the stretch ratio in each direction satisfies the range described above, a polyethylene microporous membrane having the physical properties to be desired which are disclosed in the present disclosure may be manufactured.

Since the SR$_{MD}$/SR$_{TD}$ value satisfies a range of 0.5 to 0.75, the tensile strength in the machine direction of 1500 kg/cm$^2$ or more and the tensile strength in the transverse direction of 2000 kg/cm$^2$ or more may be secured with the ratio between the tensile strengths in the machine direction and in the transverse direction to be implemented in embodiments of the present disclosure.

Stretching in operation (c) may be performed by a sequential stretching method in a roll or tenter manner, and performed at a temperature in a range from a temperature lower than the melting temperature of polyethylene by 60° C. to the melting temperature of polyethylene. When the stretching is performed in the temperature range described above, flowability of the polyethylene resin for effective stretching may be secured. Specifically, since stretching occurs uniformly throughout the sheet and fracture by stretching does not occur, stretching may stably occur, and thus, a high-quality microporous membrane having physical properties such as uniform gas permeability, puncture strength, and tensile strength throughout the membrane may be manufactured. As an example, the stretching may be performed at 80° C. to 140° C. or 90° C. to 120° C., but the embodiment is not limited thereto.

Operation (d) is an operation of extracting the diluent from the stretched film and drying the film, and the diluent inside the film is extracted using an organic solvent and then drying the film in which the diluent is replaced with the organic solvent. An organic solvent may be used without particular limitation as long as the diluent may be extracted. Specifically, for example, as the organic solvent, methyl ethyl ketone, methylene chloride, hexane, and the like may be used in terms of high extraction efficiency and rapid drying.

Operation (d) may be performed at a high temperature for increasing solubility of the diluent and the organic solvent, but may be performed at a temperature of 40° C. or lower in terms of safety due to boiling of the organic solvent.

(e) is an operation of heat treating the dried film at a temperature at which 20% to 50% of crystals of the dried film melt, and uses a device in a roll or tenter manner to apply heat in a state of being held by force so that a dimensional change in the machine direction and in the transverse direction does not occur to remove residual stress in the film, thereby decreasing the heat shrinkage rate of the finally manufactured polyethylene microporous membrane.

When the film stretched at a stretch ratio ($SR_{MD}/SR_{TD}$) between the stretch ratio in the machine direction and the stretch ratio in the transverse direction is heat treated at a temperature in the condition described above, a polyethylene microporous membrane which may secure physical properties which are not be implemented by the microporous membrane manufactured by a conventional method may be manufactured. A microporous membrane having the physical properties is appropriate for being applied to a high output/high capacity battery.

A high output/high capacity battery may refer to a secondary battery that can deliver a substantial amount of electrical power during discharge and can be used in applications where high power output is required such as electric vehicles, power tools, energy storage systems, and portable electronic devices.

In an embodiment, the temperature at which 20% to 50% of crystals of the dried film melt varies depending on the molecular weight of the used polyethylene and the elongation of the film, and in the embodiments of the present disclosure, a polyethylene having a high molecular weight is used as a polyethylene resin for manufacturing the polyethylene microporous membrane, and when considering that the weight average molecular weight of polyethylene resin may be $1 \times 10^5$ g/mol to $10 \times 10^5$ g/mol, the temperature at which 20% to 50% of the film crystals melt may be 133° C. to 145° C., specifically 135° C. to 140° C. Conventionally, the heat treatment is performed at a temperature lower than 133° C., and the microporous membrane manufactured by the heat treatment at the temperature as such has a disadvantage of not satisfying sufficient physical properties, but in the embodiments of the present disclosure, a highly crystalline polyethylene having a high melting point is used, thereby obtaining the physical properties. For example, a conventional microporous membrane does not satisfy sufficient levels of gas permeability and puncture strength or even in the case of having excellent gas permeability and puncture strength, does not have a good heat shrinkage rate, so that it is not appropriate for being used in a separator for a secondary battery.

In an embodiment, the heat treatment in operation (e) may be performed at a temperature in a range of 133° C. to 145° C., specifically at a temperature in a range of 135° C. to 140° C. Since the heat treatment is performed at the temperature in the range described above, a polyethylene microporous membrane satisfying all physical properties to be desired which are disclosed in the present disclosure may be manufactured.

In an embodiment, operation (e) may be heat fixation by heat stretching and heat mitigation. That is, the heat treatment may be performed in various ways by adjusting tension during the heat treatment. The heat treatment may be repeated 1 to 3 times, but the embodiment is not necessarily limited thereto.

Operation (e) may include, for example, a heat stretching process of stretching in the machine direction or in the transverse direction, a heat fixation process of applying heat while fixing longitudinal and transverse length/width, and a heat mitigation process of mitigating (shrinking) in the machine direction or in the transverse direction. As an example, the heat mitigation process may be mitigation to 80% to 99% or 90% to 99% of the transverse width before the heat mitigation process, and the heat stretching process may be stretching to 120% to 160% or 140% to 160% of the transverse width before the heat stretching process.

The embodiments of the present disclosure provide a separator including the polyethylene microporous membrane as described above, and the separator may be a separator used in any known energy storage device and is not particularly limited thereto. Further, in a non-limiting example, the separator may be used in a lithium secondary battery.

Hereinafter, the examples and the experimental examples will be illustrated in detail. However, the examples and the experimental examples described later are only illustrative of some, and the technology described in the present specification is not to be construed as being limited thereto.

[Method of Measuring Physical Properties]

1. Weight Average Molecular Weight (g/mol)

The weight average molecular weight (Mw) was measured using high temperature gel permeation chromatography (GPC) available from Agilent Technologies. PLgel Guard and PLgel Olexis were used as a GPC column, 1,2,4-trichlorobenzene (TCB) was used as a solvent, polystyrene was used as a standard sample, and the analysis was performed at 140° C.

2. Thickness of Microporous Membrane (μm)

The thickness of the microporous membrane was measured using a contact type thickness meter having a thickness precision of 0.1 μm. The measurement was performed at a measurement pressure of 0.63 N using TESA Mu-Hite Electronic Height Gauge available from TESA.

3. Puncture Strength (N/μm)

The puncture strength was measured by attaching a pin tip having a diameter of 1.0 mm and a radius of curvature of 0.5 mm to Universal Test Machine (UTM) 3345 available from INSTRON and pressing a microporous membrane at a speed of 120 mm/min. At this time, a load (N) when the microporous membrane was broken was divided by a thickness (μm) of the microporous membrane to calculate the puncture strength.

4. Gas Permeability (Darcy)

The gas permeability was measured using a porometer (CFP-1500-AEL available from PMI). Generally, the gas permeability is expressed in a Gurley number, but since the Gurley number is not corrected for the effect of the thickness, it is difficult to know relative permeability depending on a pore structure. In order to address this concern, the gas permeability of the present disclosure was measured using a Darcy permeability coefficient calculated from the following Mathematical Formula 1. Nitrogen was used as gas, and an average value of the Darcy permeability coefficients measured in a range of 100 to 200 psi was calculated. The calculated permeability coefficient C then corresponds to the measured/calculated "permeability value" in "Darcy".

$$\text{Darcy permeability coefficient } (C) = \qquad \text{[Mathematical Formula 1]}$$
$$(8F \cdot T \cdot V)/(\pi D^2 (P^2 - 1))$$

F=flow velocity in cc/min
T=sample thickness in mm
V=viscosity of gas (0.185 for $N_2$) in cP
D=diameter of sample in mm
P=pressure in psi 5. Tensile Strength ($kg/cm^2$)

The tensile strength was measured as strength when a microporous membrane was broken by pulling the microporous membrane in the transverse direction and in the machine direction, respectively at a speed of 100 mm/min using a Universal Test Machine (UTM) 3345 available from INSTRON in accordance with ASTM D882.

6. Shrinkage Rate in the Transverse Direction (%)

A microporous membrane of 15 cm×15 cm in which each of vertical and horizontal directions was indicated at a length of 10 cm was allowed to stand in an oven (DKN612 available from Yamato) of which the temperature was stabilized to 131° C. for 1 hour, and a change in length was measured to calculate the shrinkage rate in the transverse direction by a method of the following Mathematical Formula 2:

$$\text{Shrinkage rate in the transverse direction} \qquad \text{[Mathematical Formula 2]}$$
$$(\%) = \{(\text{transverse length before heating} -$$
$$\text{transverse length after heating})/$$
$$\text{transverse length before heating}\} \times 100$$

7. Hot-Box Evaluation

The hot-box evaluation was performed using an assembled battery to which a polyethylene microporous membrane was applied as a separator. Specifically, a positive electrode using NCM 622 (Ni:Co:Mn=6:2:2) as an active material and a negative electrode using graphite carbon as an active material were wound with a manufactured microporous membrane and added to an aluminum pouch, an electrolyte solution of 1 M lithium hexafluorophosphate ($LiPF_6$) dissolved in a solution including ethylene carbonate, ethyl methyl carbonate, and diethyl carbonate at a volume ratio of 3:5:2 was injected thereinto, and the pouch was sealed, thereby assembling a battery having a capacity of 2 Ah. The assembled battery was subjected to aging and degassing operations, fully charged to 4.2 V, put into an oven, heated at 5° C./min to reach 130° C., and then allowed to stand for 30 minutes, thereby measuring a battery change.

When fuming or ignition occurred in the battery after 30 minutes at 130° C., it was determined as Fail, and when no change in voltage/current of the battery and fuming and ignition did not occur, it was determined as Pass.

8. Analysis of Thermal Properties of Film

A phenomenon in which crystals of a film introduced to a heat fixation device melt depending on a temperature was analyzed using Discovery DSC250 which is a differential scanning calorimeter (DSC) available from TA Instruments, and the analysis was performed under the conditions of a sample weight of 5 mg and a scanning speed of 10° C./min.

Specifically, the temperature ($T_{m1}$) at which 20% of crystals of a film introduced to the heat fixation device melt and a temperature ($T_{m2}$) at which 50% of the crystals melt were measured in a manner of calculating a temperature ($T_{m1}$) at a point showing a heat of fusion of 20% and a temperature ($T_{m2}$) at a point showing a heat of fusion of 50% with respect to the total heat of fusion of a film introduced to the heat fixation.

9. Porosity (%)

The porosity was calculated by the following equation. Specifically, a sample having a width of A cm, a length of B cm, and a thickness of T cm was prepared, its mass was measured, and the porosity was calculated from a ratio between a mass of a resin having the same volume and a mass of a microporous membrane.

$$\text{Porosity } (\%) = 100 \times \{1 - M/(A \times B \times T \times \rho)\}$$

wherein M is a mass (g) of a microporous membrane, and ρ is a density ($g/cm^3$) of a polyethylene resin forming a microporous membrane.

Example 1

A mixture including a high-density polyethylene resin (0.95 $g/cm^3$) having a weight average molecular weight of 5.0×10⁵ g/mol and a melting temperature of 135° C. and a paraffin oil having a kinematic viscosity of 80 cst at 40° C. at a weight ratio of 30:70 was melted and kneaded using a twin-screw extruder to melt. The melting temperature was measured using the differential, scanning calorimeter (DSC) Discovery DSC250 available from TA Instruments, and the measurement was performed under the conditions of a sample weight of 5 mg and a scanning speed of 10° C./min.

The melt was continuously extruded through a T-die and a casting roll set to 30° C. and was used to manufacture a sheet having a width of 300 mm and an average thickness of 700 μm. The sheet was stretched in the machine direction in a roll manner so that the sheet became 6 times larger at a temperature of 100° C., and continuously stretched in the transverse direction to 8 times at a stretching temperature of 118° C. by guidance with a tenter.

The paraffin oil was extracted from the film which completed stretching in the machine direction and in the transverse direction at 25° C. using methylene chloride, and the film from which the paraffin oil was extracted was dried at 50° C. The dried film was heat stretched in the transverse direction at 136° C. at which 38% of crystals of the dried film melts to 150% using a tenter type heat fixation device, heat fixed for 10 seconds, and heat mitigated (shrunk) to 93% of the width before the heat mitigation process to manufacture a microporous membrane having a thickness of 5 μm.

The physical properties of the finally manufactured microporous membrane and the performance of a battery to which the microporous membrane was applied are listed in Table 2.

Examples 2 to 4 and Comparative Examples 1 to 5

Polyethylene microporous membranes were manufactured in the same manner as in Example 1, except that the stretch ratio in the machine/transverse direction and the heat fixation temperature were changed to the conditions described in Table 1, and the physical properties of the finally manufactured microporous membranes and the performance of batteries to which the microporous membranes were applied are listed in Table 2.

The microporous membranes of Comparative Examples 1 and 2 were subjected to the stretching operation at a ratio ($SR_{MD}/SR_{TD}$) between the stretch ratio in the machine direction and the stretch ratio in the transverse direction of more than 0.75, and as a result, had the ratio ($TS_{MD}/TS_{TD}$) between the tensile strength in the machine direction and the tensile strength in the transverse direction of more than 0.7 and the shrinkage rate in the transverse direction at 131° C. of more than 10%, and thus, the batteries to which the microporous membranes were applied had greatly deteriorated thermal safety.

The microporous membrane of Comparative Example 3 was subjected to the stretching operation at a ratio ($SR_{MD}/SR_{TD}$) between the stretch ratio in the machine direction and the stretch ratio in the transverse direction of 0.75, but as a result of performing heat fixation at a temperature lower than the temperature of the examples, had the ratio ($TS_{MD}/TS_{TD}$) between the tensile strength in the machine direction

TABLE 1

| Unit | Stretch ratio in the machine direction ($SR_{MD}$) Times | Stretch ratio in the transverse direction ($SR_{TD}$) Times | $SR_{MD}/SR_{TD}$ — | Heat fixation temperature ° C. | $T_{m1}$ ° C. | $T_{m2}$ ° C. |
|---|---|---|---|---|---|---|
| Example 1 | 6.0 | 8.0 | 0.75 | 136 | 134.2 | 141.3 |
| Example 2 | 6.0 | 9.0 | 0.67 | 136.5 | 134.3 | 142.1 |
| Example 3 | 5.0 | 9.0 | 0.55 | 136.5 | 134.1 | 141.4 |
| Example 4 | 5.0 | 10.0 | 0.5 | 137 | 134.5 | 143.2 |
| Comparative Example 1 | 8.0 | 8.0 | 1.0 | 136.5 | 135.2 | 146.5 |
| Comparative Example 2 | 8.0 | 10.0 | 0.8 | 137 | 135.9 | 147.3 |
| Comparative Example 3 | 6.0 | 8.0 | 0.75 | 132 | 134.2 | 141.3 |
| Comparative Example 4 | 3.8 | 8.0 | 0.48 | 136 | 133.3 | 139.2 |
| Comparative Example 5 | 6.0 | 5.1 | 1.18 | 134 | 132.9 | 137.8 | and the tensile strength in the transverse direction of more

TABLE 2

| Unit | Thickness μm | Porosity % | Puncture strength N/μm | Gas permeability $10^{-5}$ Darcy | Tensile strength in the machine direction ($TS_{MD}$) kg/cm² | Tensile strength in the transverse direction ($TS_{TD}$) kg/cm² | $TS_{MD}/TS_{TD}$ — | Shrinkage rate in the transverse direction at 131° C. % | Hot-box evaluation — |
|---|---|---|---|---|---|---|---|---|---|
| Example 1 | 5.0 | 35 | 0.55 | 1.7 | 2100 | 3500 | 0.6 | 5.0 | Pass |
| Example 2 | 4.6 | 36 | 0.57 | 1.8 | 2150 | 3600 | 0.6 | 4.6 | Pass |
| Example 3 | 5.2 | 34 | 0.56 | 1.6 | 2000 | 3700 | 0.54 | 3.9 | Pass |
| Example 4 | 4.7 | 34 | 0.58 | 1.6 | 2050 | 3900 | 0.53 | 2.1 | Pass |
| Comparative Example 1 | 3.9 | 39 | 0.62 | 1.9 | 2700 | 2200 | 1.23 | 15.0 | Fail |
| Comparative Example 2 | 3.1 | 34 | 0.65 | 1.6 | 2800 | 2750 | 1.02 | 11.0 | Fail |
| Comparative Example 3 | 5.3 | 38 | 0.53 | 1.9 | 2300 | 2800 | 0.82 | 13.5 | Fail |
| Comparative Example 4 | | | | Film breakage | | | | | |
| Comparative Example 5 | 6.4 | 27 | 0.35 | 0.3 | 1900 | 1600 | 1.19 | 14.5 | Fail |

60

Referring to Tables 1 and 2, since the microporous membranes of the examples satisfied all of the physical properties to be desired which are disclosed in the present disclosure, the batteries to which the microporous membranes were applied passed the hot-box evaluation and achieved excellent thermal safety.

than 0.7 and the shrinkage rate in the transverse direction at 131° C. of more than 10%, and thus, the battery to which the microporous membrane was applied had greatly deteriorated thermal safety.

The microporous membrane of Comparative Example 4 was subjected to the stretching operation at a stretch ratio in the machine direction of less than 4.0 times and a ratio ($SR_{MD}$/$SR_{TD}$) between the stretch ratio in the machine direction and the stretch ratio in the transverse direction of less than 0.5, and as a result, had low strength in the machine direction to cause film breakage, so that film manufacture was impossible.

The microporous membrane of Comparative Example 5 was subjected to the stretching operation at a stretch ratio in the transverse direction of less than 5.3 times and a ratio ($SR_{MD}$/$SR_{TD}$) between the stretch ratio in the machine direction and the stretch ratio in the transverse direction of more than 0.75, and as a result, did not implement the gas permeability to be desired as disclosed in the present disclosure, and the battery to which the microporous membrane was applied was not able to implement performance as a battery and had greatly deteriorated thermal safety.

The polyethylene microporous membrane according to the embodiments of the present disclosure may have excellent mechanical strength and permeability and also secure significantly improved heat resistance at a high temperature.

In addition, the polyethylene microporous membrane according to the embodiments of the present disclosure may have a puncture strength of 0.25 N/μm or more, a tensile strength in the machine direction (MD) of 1500 kg/cm² or more, a tensile strength in the transverse direction (TD) of 2000 kg/cm² or more, and a gas permeability of 1.5×10⁻⁵ Darcy or more.

In addition, the polyethylene microporous membrane according to the embodiments of the present disclosure may have a shrinkage rate in the transverse direction of 10% or more as measured after being allowed to stand at 131° C. for 1 hour.

In addition, the embodiments of the present disclosure may provide a battery having excellent thermal safety at a high temperature so that fuming or ignition does not occur in a high temperature environment, by including the polyethylene microporous membrane according to an embodiment. Specifically, the embodiments of the present disclosure may provide a battery which may have excellent thermal safety at a high temperature so that battery fuming or ignition does not occur in a high-temperature hot-box evaluation at 130° C.

Hereinabove, although the embodiments of the present disclosure have been described by specific examples and limited embodiments in the present specification, they have been provided only for assisting the entire understanding of the present disclosure, and the present disclosure is not limited to the embodiments herein. Various modifications and changes may be made from the description by those skilled in the art to which the present disclosure pertains and those modifications and changes should be considered part of the present disclosure. Furthermore, the embodiments may be combined to form additional embodiments.

What is claimed is:

1. A polyethylene microporous membrane comprising a polyethylene having a weight average molecular weight of 1×10⁵ g/mol to 10×10⁵ g/mol, wherein the microporous membrane has a thickness of 3 μm to 20 μm, a puncture strength of 0.25 N/μm or more, a gas permeability of 1.5×10⁻⁵ Darcy or more, a shrinkage rate in the transverse direction of 10% or less as measured after being allowed to stand at 131° C. for 1 hour, a tensile strength in the machine direction ($TS_{MD}$) of 1500 kg/cm² or more, a tensile strength in the transverse direction ($TS_{TD}$) of 2000 kg/cm² or more, and a ratio ($TS_{MD}$/$TS_{TD}$) between the tensile strength in the machine direction and the tensile strength in the transverse direction of 0.5 to 0.7.

2. The polyethylene microporous membrane of claim 1, wherein the tensile strength in the machine direction is 2000 kg/cm² or more and the tensile strength in the transverse direction is 2800 kg/cm² or more.

3. The polyethylene microporous membrane of claim 1, wherein an average value of the tensile strength in the machine direction and the tensile strength in the transverse direction is 2500 kg/cm² or more.

4. The polyethylene microporous membrane of claim 1, wherein the puncture strength is 0.50 N/μm or more.

5. The polyethylene microporous membrane of claim 1, wherein the microporous membrane has a porosity of 30% to 70%.

6. The polyethylene microporous membrane of claim 1, wherein the microporous membrane is manufactured by a wet method including a sequential biaxial stretching process.

7. The polyethylene microporous membrane of claim 1, wherein the puncture strength is 0.50 N/μm or more, the tensile strength in the machine direction ($TS_{MD}$) is 2000 kg/cm² or more, and the tensile strength in the transverse direction ($TS_{TD}$) of 2800 kg/cm² or more.

8. A separator comprising the polyethylene microporous membrane of claim 1.

9. An electrochemical device comprising the separator of claim 8.

10. The electrochemical device of claim 9, which is a secondary battery comprising said separator between a positive electrode and a negative electrode.

11. A method for manufacturing a polyethylene microporous membrane, the method comprising:

(a) melting and kneading a mixture including a polyethylene resin having a weight average molecular weight of 1×10⁵ g/mol to 10×10⁵ g/mol and a diluent through an extruder to prepare a melt;

(b) extruding the melt to mold it into a sheet form;

(c) sequentially biaxially stretching the sheet in the machine direction and in the transverse direction to mold it into a film;

(d) extracting the diluent from the stretched film and drying the film; and (e) heat treating the dried film at a temperature at which 20% to 50% of crystals of the dried film melt, wherein the temperature at which 20% to 50% of crystals of the dried film melt in (e) is 133° C. to 145° C., wherein in (c), a stretch ratio in the machine direction ($SR_{MD}$) is 4.0 times or more, a stretch ratio in the transverse direction ($SR_{TD}$) is 5.3 times or more, and a ratio ($SR_{MD}$/$SR_{TD}$) between the stretch ratio in the machine direction and the stretch ratio in the transverse direction is 0.5 to 0.75.

12. The method of claim 11, wherein the weight ratio of the polyethylene resin to the diluent is 10-60:90-40.

13. The method of claim 11, wherein the diluent is selected from the group consisting of aliphatic or cyclic hydrocarbons, phthalic acid esters, C10-C20 fatty alcohols, or combinations thereof.

14. The method of claim 11, wherein the diluent comprises a paraffin oil having a kinetic viscosity at 40° C. of 20 cSt to 200 cSt.

15. The method of claim 11, wherein operation (b) comprises casting or calendaring while the melt is extruded through a T-die and cooled to a temperature of 10° C. to 80° C.

16. The method of claim 11, wherein operation (d) comprises extracting the diluent with an organic solvent.

17. The method of claim 16, wherein the organic solvent comprises methyl ethyl ketone, methylene chloride, and/or hexane.

18. The method of claim 11, wherein operation (e) is accomplished using a device in a roll or tenter manner to apply heat in a state of being held by force so that a dimensional change in the machine direction and in the transverse direction does not occur.

19. The method of claim 11, wherein operation (e) is repeated 1 to 3 times.

* * * * *